Figure 1:
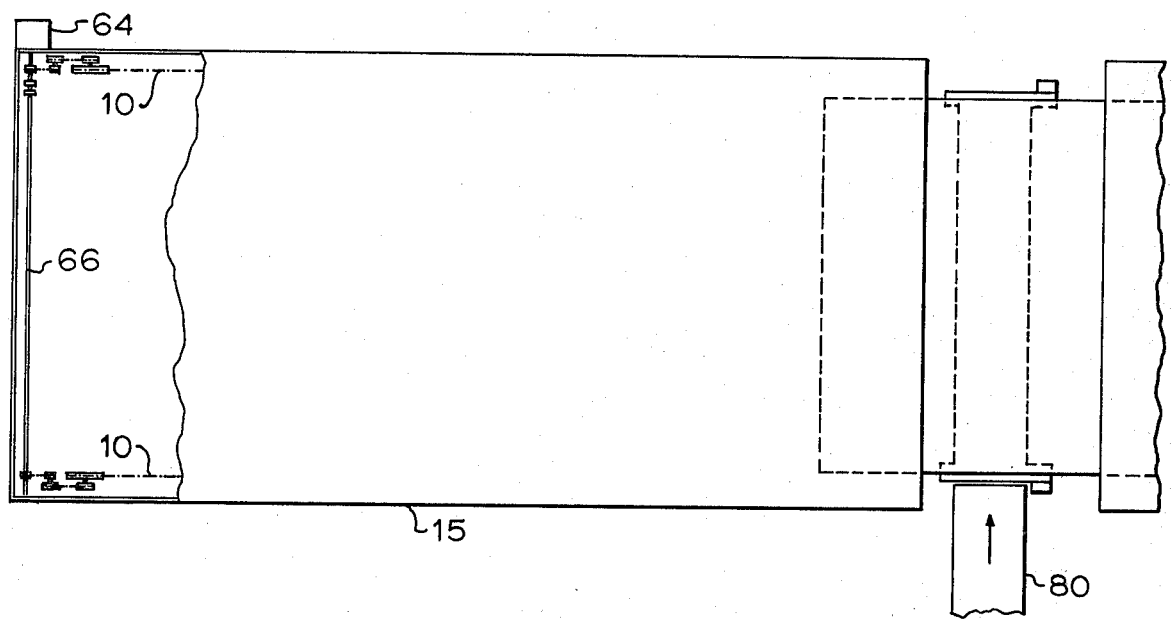

United States Patent [19]

Haessler et al.

[11] 4,346,803

[45] Aug. 31, 1982

[54] CONVEYOR

[75] Inventors: Wolfgang Haessler, Orangeville; Djuro Slivar, Brampton, both of Canada

[73] Assignee: Haessler & DeWay Limited, Brampton, Canada

[21] Appl. No.: 866,637

[22] Filed: Jan. 3, 1978

[51] Int. Cl.³ .............................................. B65G 23/44
[52] U.S. Cl. .................................... 198/813; 198/800; 198/834; 198/482
[58] Field of Search .............................. 198/482–484, 198/796, 798, 800, 834, 813; 99/443 C

[56] References Cited

U.S. PATENT DOCUMENTS

| 1,531,847 | 3/1925 | Danforth et al. | 198/800 |
|---|---|---|---|
| 1,766,142 | 6/1930 | Olson | 198/482 |
| 1,905,924 | 4/1933 | MacLauchlan | 198/800 |
| 2,781,121 | 2/1957 | Brandenberger | 198/796 |
| 3,093,233 | 6/1963 | Klenk | 198/796 |
| 3,101,143 | 8/1963 | Valentyne et al. | 198/796 |
| 3,395,653 | 8/1968 | Messerly et al. | 198/796 |

Primary Examiner—Joseph E. Valenza

[57] ABSTRACT

The invention provides an endless conveyor designed to provide in a multiplicity of tiers of chain length racks which carry removable material carriers in upright orientation. In one aspect, tensioning of the chain is performed by providing a shaft, for a sprocket connected to the end of a chain length, slidably mounted. The drive chain for supplying torque to the drive shaft is directed and tensioned to tension the conveyor chain. In another aspect the travelling rack is designed with longitudinal recesses between support members so that stationary cantilever members may be inserted therebetween for unloading or loading. In another aspect there is provided a loader that tilts in synchronism with the conveyor and in juxtaposition to a conveyor rack during the loading of a pan on the rack.

4 Claims, 29 Drawing Figures

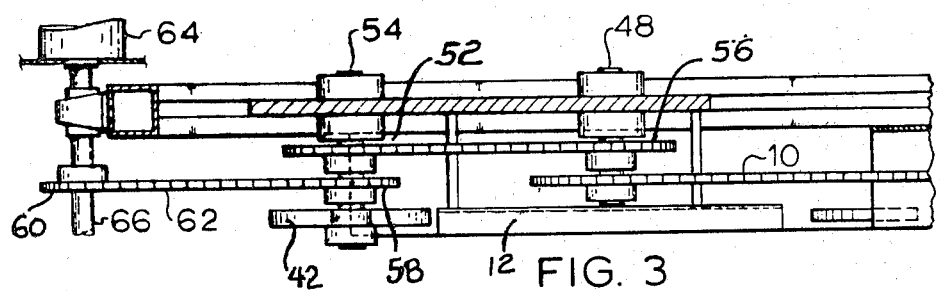
FIG. 3
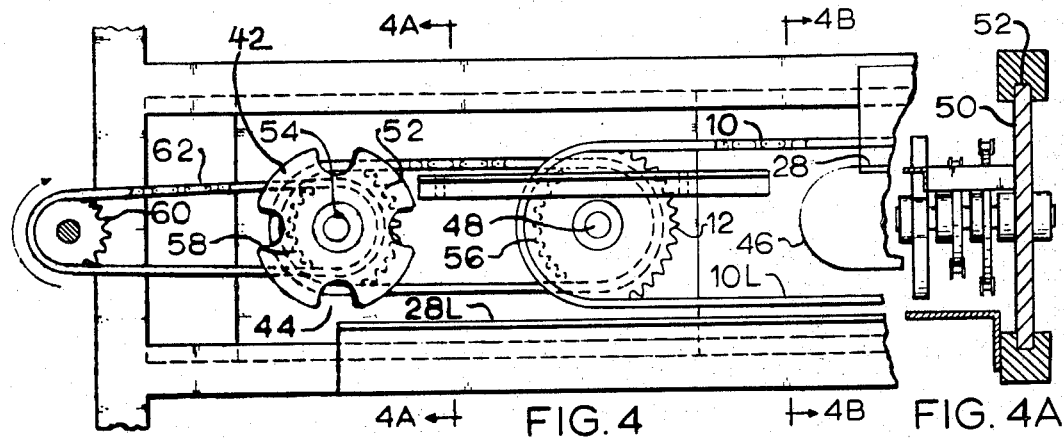
FIG. 4
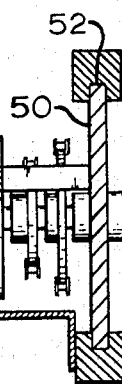
FIG. 4A
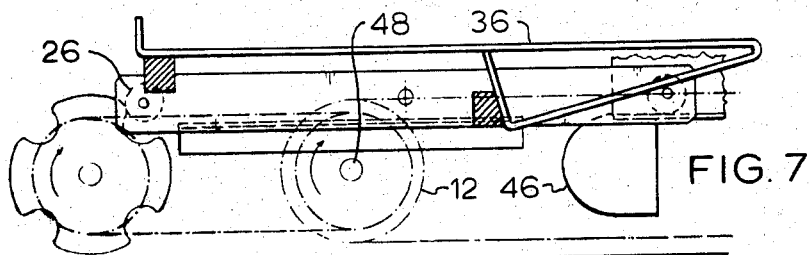
FIG. 7
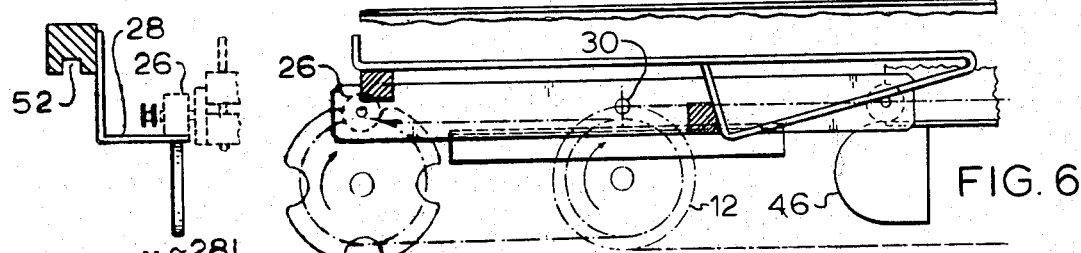
FIG. 6
FIG. 4B
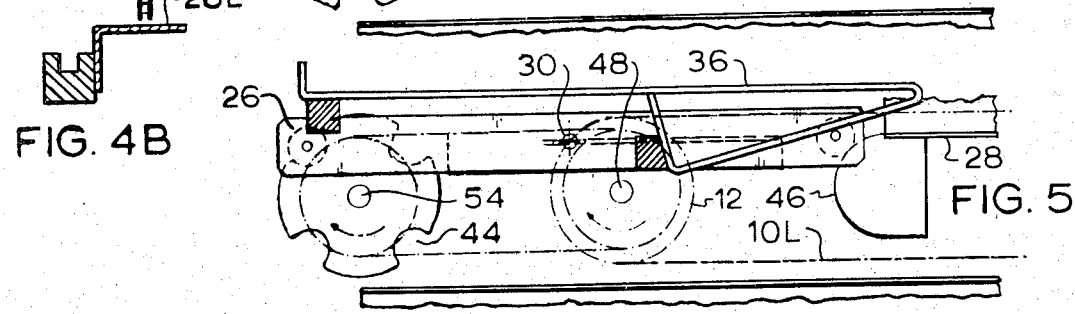
FIG. 5

CONVEYOR

This invention relates to a conveyor construction, and to loaders and unloaders therefor where the conveyor is used to carry materials, commonly but not necessarily foodstuffs, in applications where the residence time on the conveyor is of importance.

Such applications requiring residence time include a proofer for bakeries, or means for freezing in the preparation of frozen food. Applications for the invention include simple storage on the conveyor.

The most common form of the conveyor in accord with the invention may be considered as a conveyor operating on endless chains driven by sprocket gears, where the endless chain, corresponding to the path of the conveyor, defines a plurality of tiers of chain lengths, but where the number of tiers and the length thereof is not critical to the invention but rather may be chosen in accord with the particular space available for a particular application.

In one facet of the invention, there is provided means for tensioning the conveyor lengths. In accord with such means, the sprocket at one end of a length of the conveyor chain (sometimes called a first sprocket in the claims) is mounted so that its shaft is slidable relative to the conveyor mounting, in a direction to tension the conveyor chain. Preferably such shaft is made so slidable by mounting it on a block, in turn, slidable in the aforesaid direction on the conveyor mounting. A second sprocket connected to drive the first or conveyor sprocket is mounted to slide with the conveyor sprocket, e.g. on the shaft. Drive means exterior to the slidable mount operates a chain drive to the second sprocket from a direction such that the chain drive to the second sprocket tends to tension the block and the conveyor chain length. The radius of the second sprocket, connected to the exterior means, is less than the conveyor sprocket connected to the conveyor chain length. Because the torques on the two sprockets must be equal it is obvious that the tension on the chain from the drive means to the second sprocket must be greater than that in the conveyor chain. Hence the conveyor chain is tensioned. Such tensioning means may be used in a plurality of locations in such a storage conveyor. For example, if such a conveyor comprises, at each end, five vertically disposed sprockets defining one end of each of five pairs of length (i.e. 10 lengths) of the endless conveyor chain, then each or preferably alternate one of the five sprockets may be provided with such tensioning means.

In another aspect of the invention, convenient loading or unloading means is provided for applications wherein such loading or unloading must be performed with as little vibration or jarring of the contents as possible. For example, in a bakery proofer, pans of dough must be supplied to the conveyors to rise on the conveyor in a proofer, i.e. an enclosure, enclosing the conveyor at a predetermined temperature. The risen dough leaving the conveyor must be extremely gently handled. The inventive means is therefore applied to the unloading means of a bakery proofer. The dough entering such proofer may, on the other hand, be more roughly handled. Conversely in a conveyor operating in an enclosure comprising a location for freezing T.V. dinners, such dinners have a high liquid content when being loaded on the conveyor and must be gently handled, requiring inventive arrangement as a loader. Accordingly the inventive arrangement would be used in loading such T.V. dinners. On the other hand, such dinners emerge from the freezer as a frozen slab and may be less gently handled.

In accord with the invention for the gentle loading or unloading of materials from the conveyors, the conveyor is designed with a special racks connected to the endless chain of the conveyor for movement therewith. The special rack comprises a plurality of supports arranged to define spaced extending in the conveyor travel direction. Preferably such spaces are defined between parallel bars extending in the conveyor travel direction. The conveyor and rack define an upright attitude for pans resting thereon. Such pans are designed for carrying foodstuffs or other materials. The supports and the spaces between them are designed so that exterior mounted cantilever members may be received lengthwise into the spaces, which spaces are dimensioned so that there is room for the reception of the cantilever members in the spaces with the upper level of the cantilever members lower than the upper level of the supports.

In the bakery proofer application, the conveyor is provided with a horizontal length of the conveyor endless chain followed by an length where the endless chain travels downwardly, (The conveyor is designed so that during each downward travel, the racks all maintain the pans substantially upright). There are provided cantilever extents, mounted exterior to the conveyor and designed, as a rack on the conveyor approaches the end of such horizontal extent, to be received in the spaces with the upper level of the cantilever extents lower than the upper level of said supports. Thus when the conveyor chain and rack move on the downward extent, the cantilever extents rise between the rack supports and lift a pan or other material container off the rack supports.

Conversely, in the loading application, the conveyor is provided with an upward extent followed by an horizontal extent. The supports and spaces are arranged as discussed previously. The cantilever extents are arranged and dimensioned so that they are received in the spaces of a rack on its movement along the upward extent and so that the rack support lift a pan or material container off the cantilever extents and then move away, along the horizontal extent carrying the pan received from the cantilever members.

In the unloader and loader applications, means are provided on the cantilever extents to convey material from the conveyor to the cantilever extents, in the case of the unloader, and from the cantilever extents to the conveyor in the case of the loader. In either alternative the preferred form of such cantilever extents is a chain guide supported to extend in a cantilever manner and to support a chain mounted on the periphery of such guide (as with a chain saw) and movable to convey a tray thereon in the desired direction for loading or unloading.

The invention provides for preferred use in a bakery proofer an different form of loader where the racks are to be loaded in the middle of a downward extent. In this alternative a loader is located with one end adjacent the path of the conveyor racks thereby and the other end swingably mounted on a support. The loader is designed to support pans for loading on the rack and the end of the loader adjacent the path of the racks on the conveyor is caused to move in synchronism with the conveyor to maintain its adjacent end in juxtaposition with the rack being loaded during a predetermined length of travel of a rack downwardly therepast. During such tipping movement of the unloader the pan or pans on the loader are transferred to the adjacent rack by means to be described. Preferably such movement of the adjacent end of the unloader is achieved by a cam driven in synchronism with the conveyor and supporting a cam follower which, in turn, supports the forward end of the loader platform. The cam is designed during non-loading periods to support the loader platform in approximately horizontal position. The cam is designed, at the time that a downwardly travelling rack comes level with the loader platform, to cause the adjacent end of the loading platform to drop in concert with the rack as the tray or equivalent is transferred from the platform to the rack. The loader is then returned by the cam to horizontal position.

The term "pan" is used herein to denote the platform or container which carries foodstuffs or materials which, with the "pan" are to be loaded on, unloaded from and carried on the conveyor racks. The "pan" will of course be differently shaped and designed to suit the material or objects to be carried thereon but will be designed to travel on the inventive rack and to operate with the inventive loading and unloading mechanism.

The cam is designed, during non-loading periods, to support the loader platform in approximately horizontal position. The cam is designed, at the time that a downwardly travelling rack comes level with the loader platform, to cause the adjacent end of the loading platform to drop in concert with the racks as the tray or equivalent is transferred from the platform to the rack. The loader is then returned by the cam to horizontal position.

The term "pan" is used herein to denote the platform or container which carries foodstuffs or materials which, with the "pan" are to be loaded on, unloaded from on carried on the conveyor racks. The "pan" will of course be differently shaped and designed to suit the material or objects to be carried thereon but will be designed to travel on the inventive rack and to operate with the inventive loading and unloading mechanism.

Figure 2:
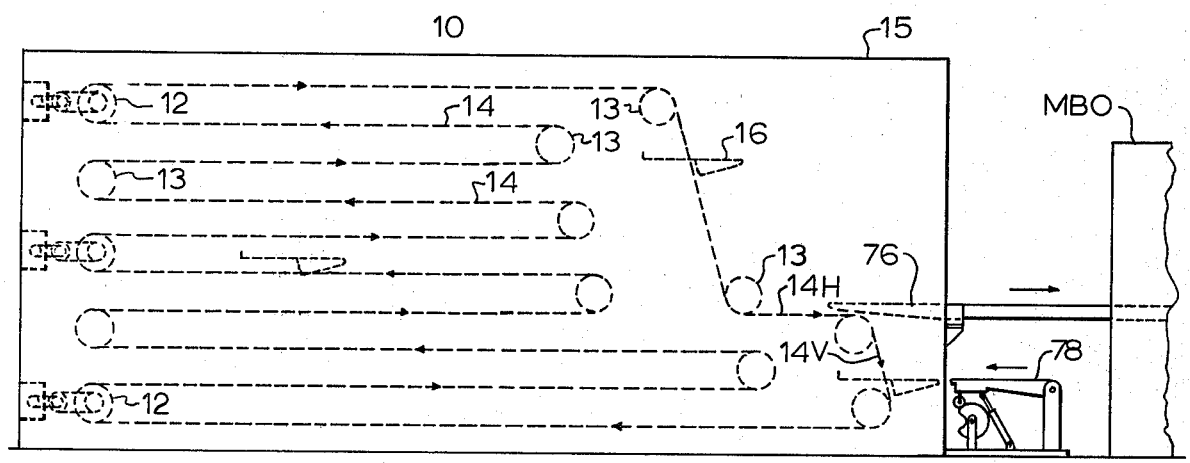
Figure 8:
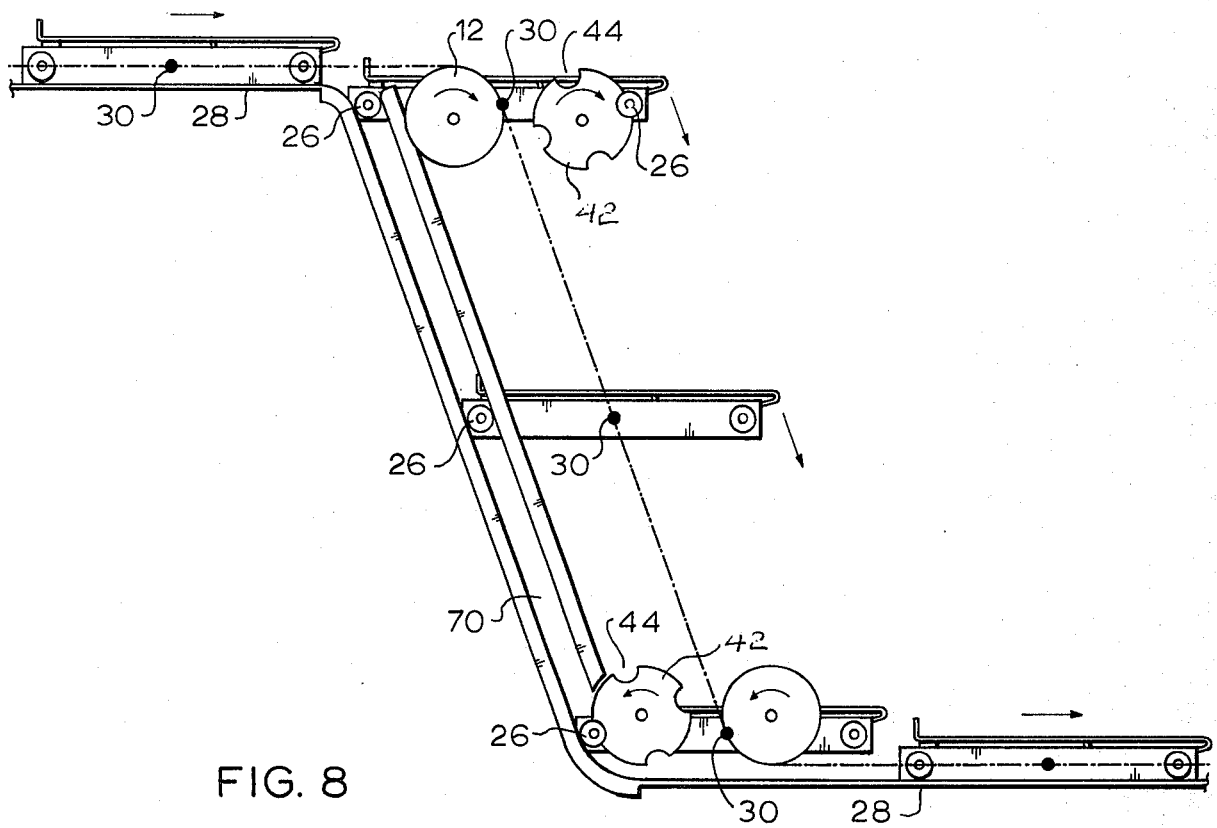
Figure 9:
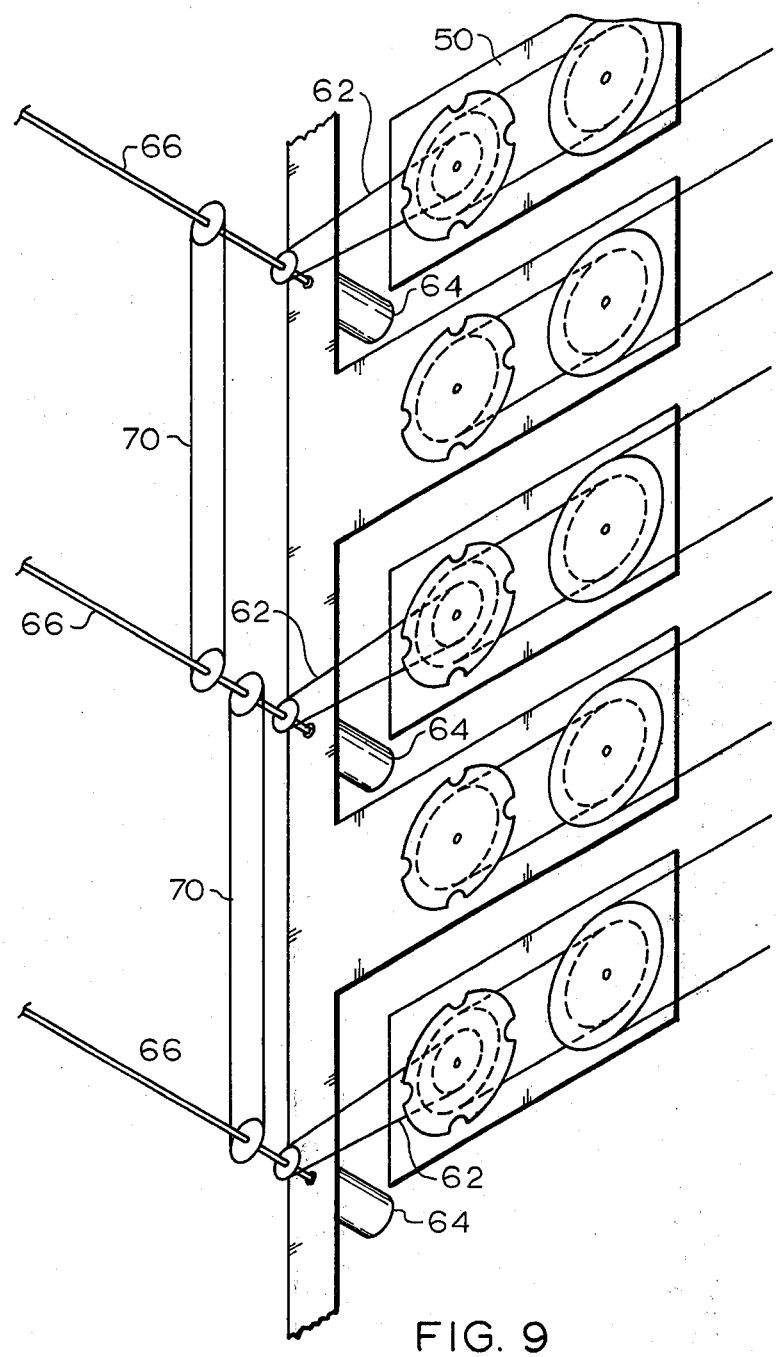
Figure 10:
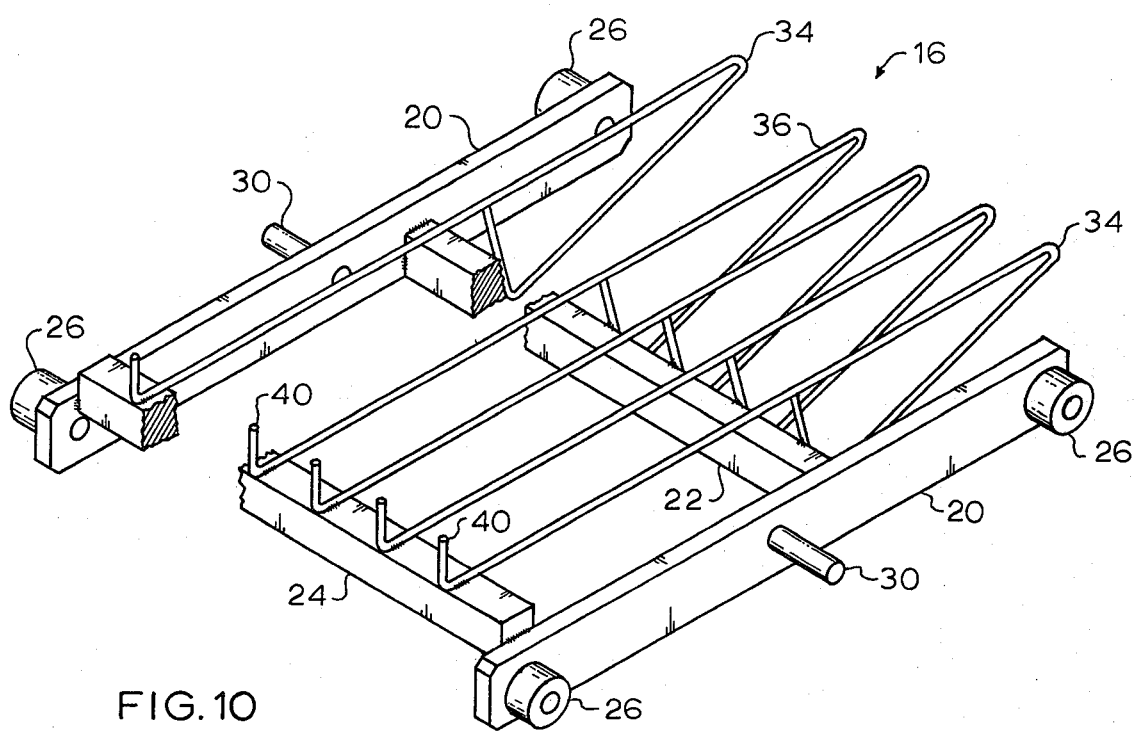
Figure 11:
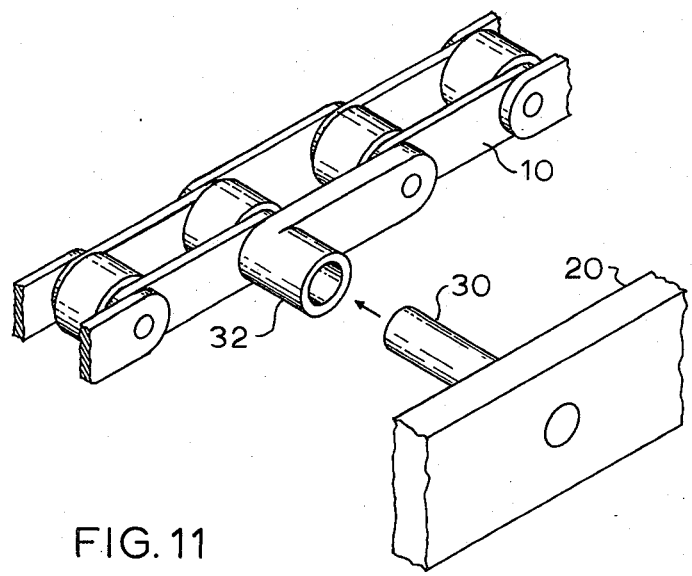
Figure 12:
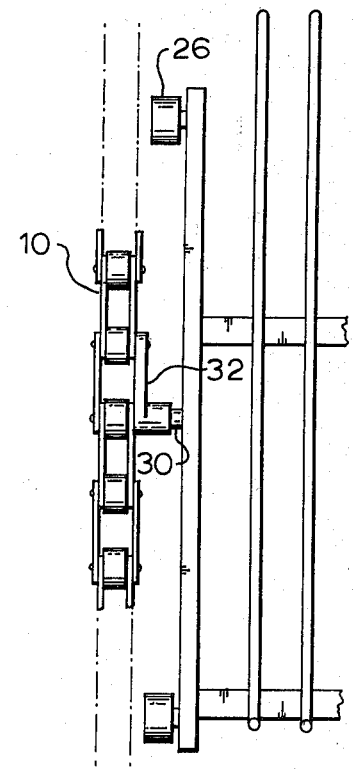
Figure 13:
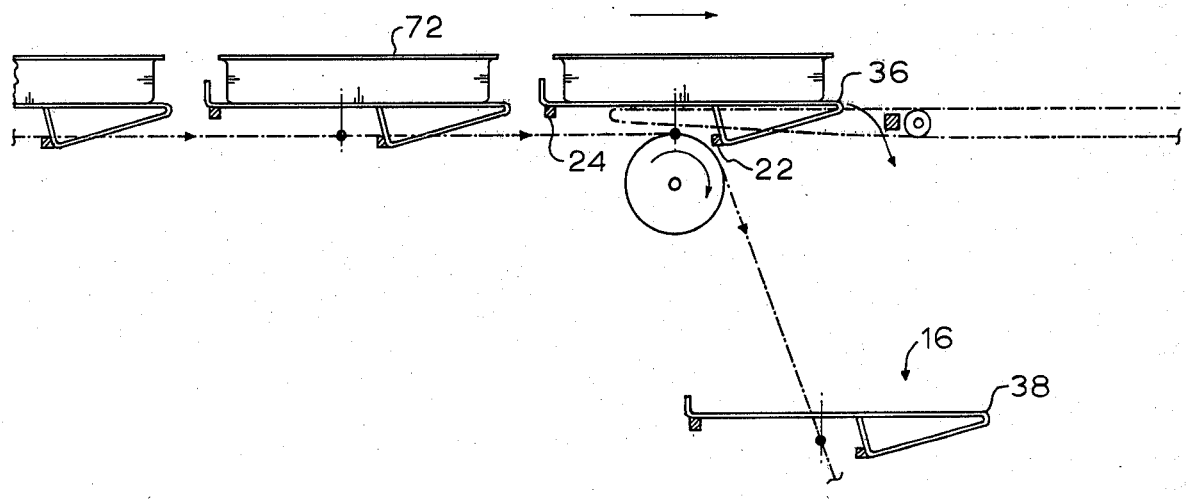
Figure 14:
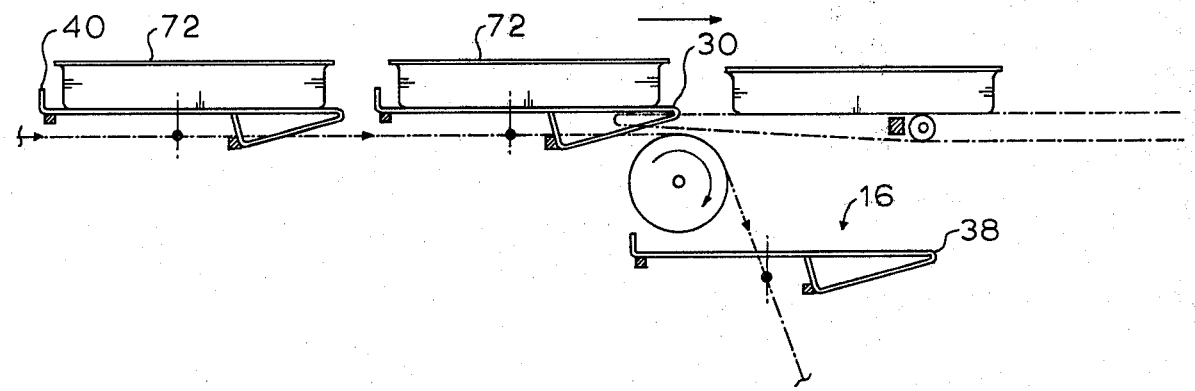
Figure 15:
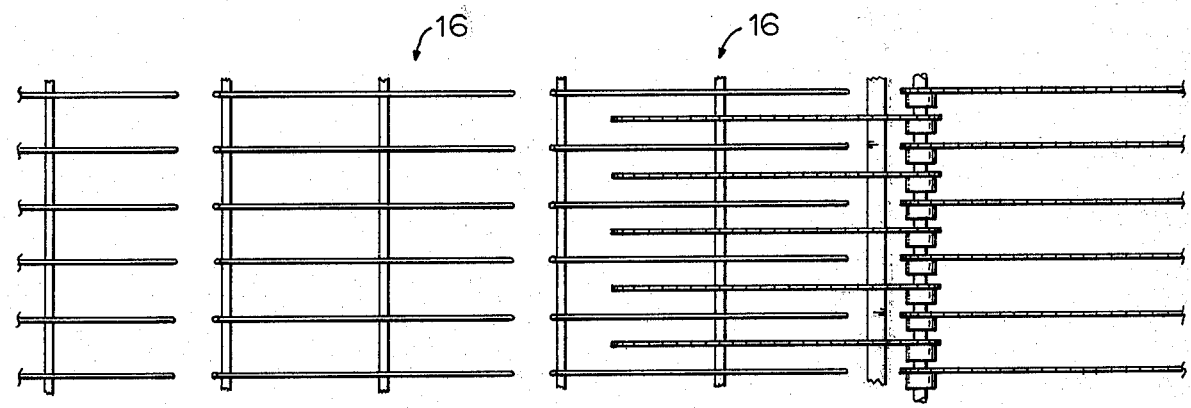
Figure 16:
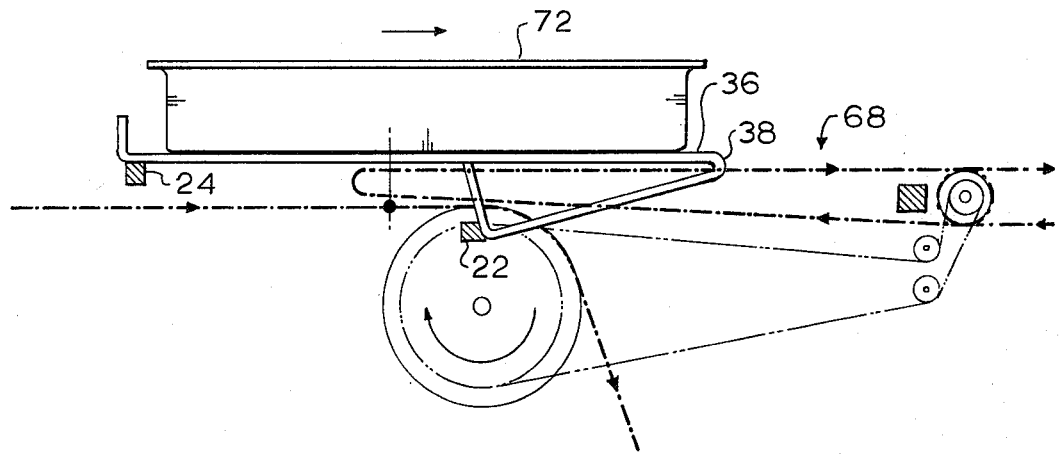
Figure 17:
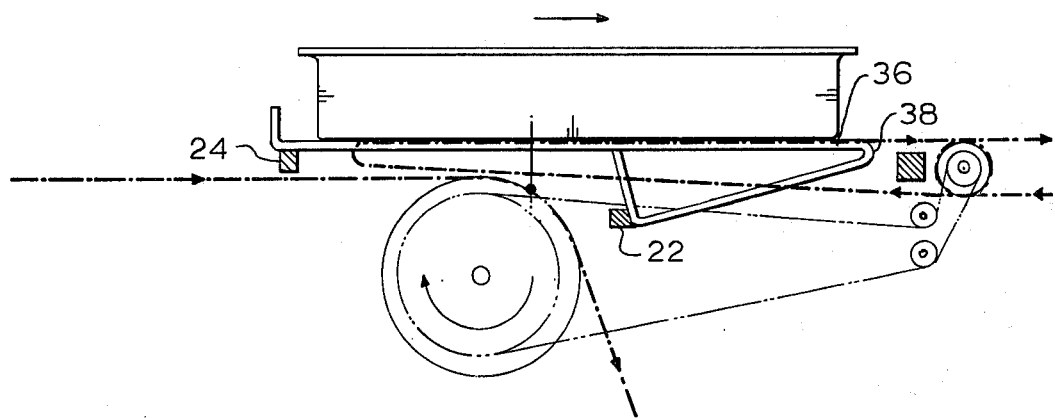
Figure 18:
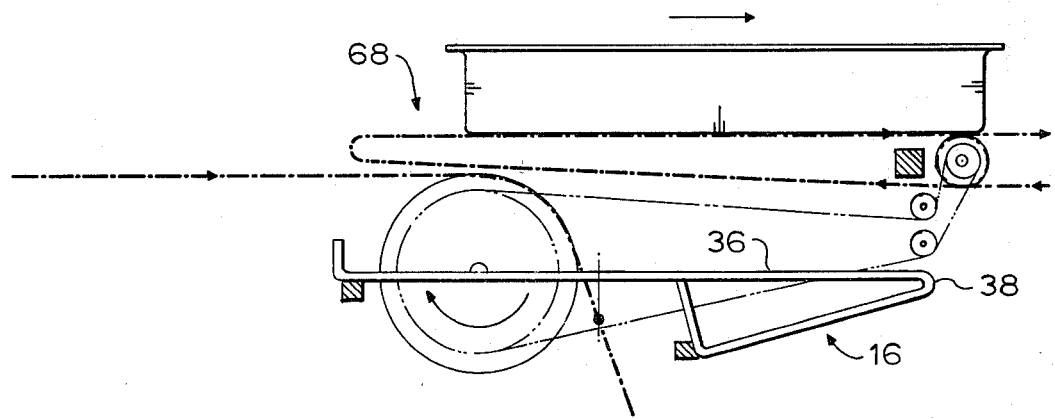
Figure 19:
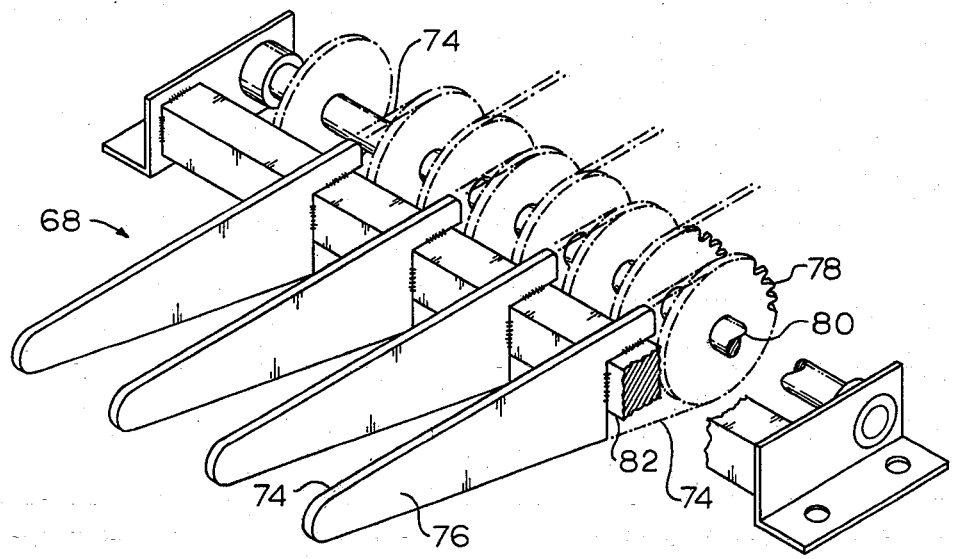
Figure 20:
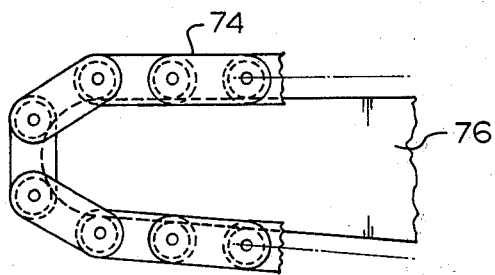
Figure 21:
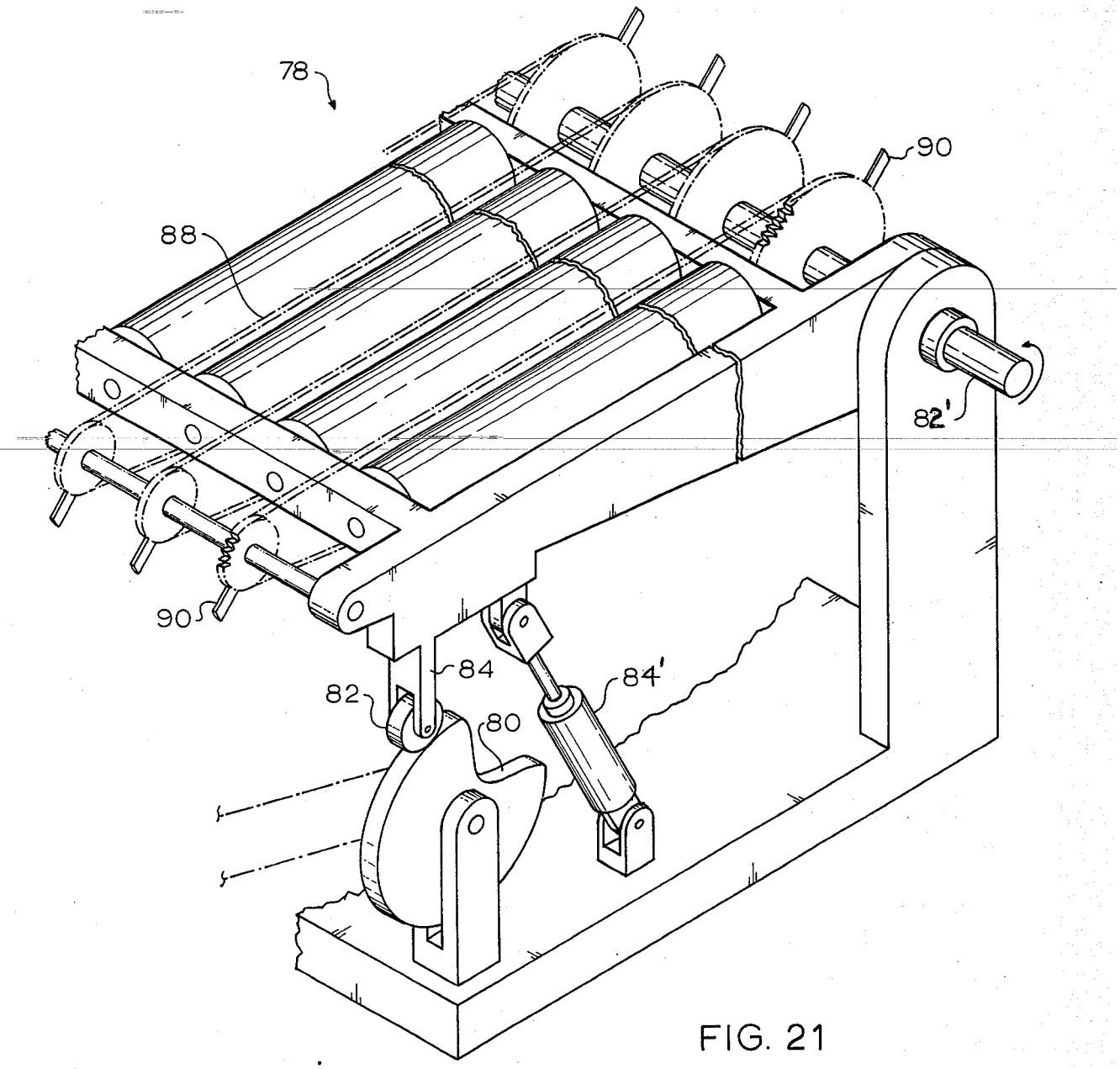
Figure 22:
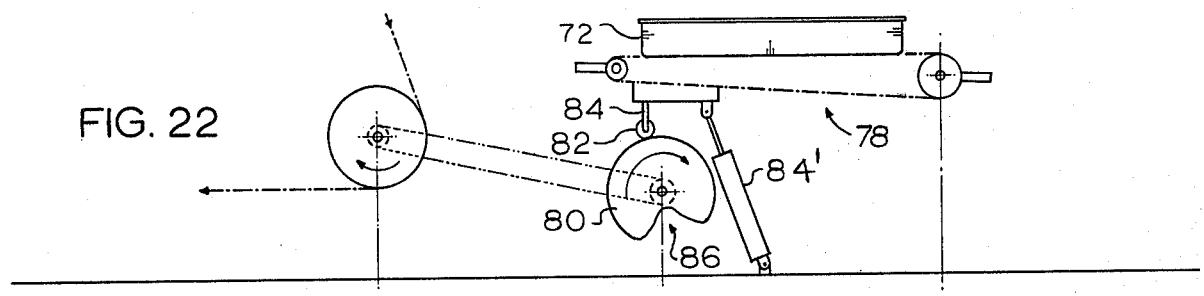
Figure 23:
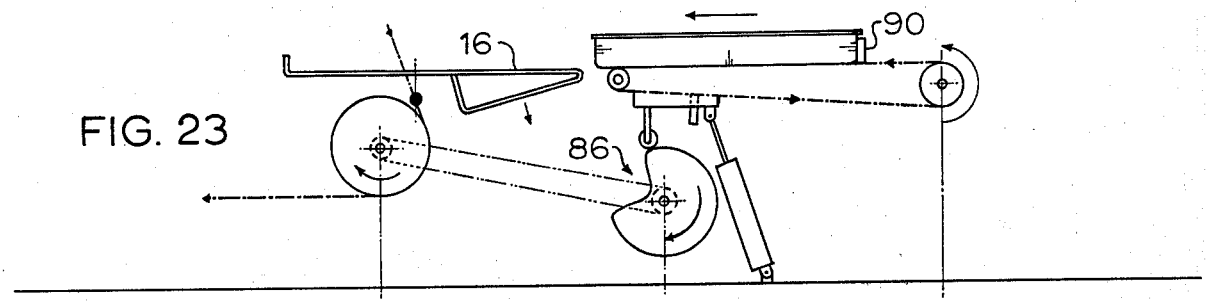
Figure 24:
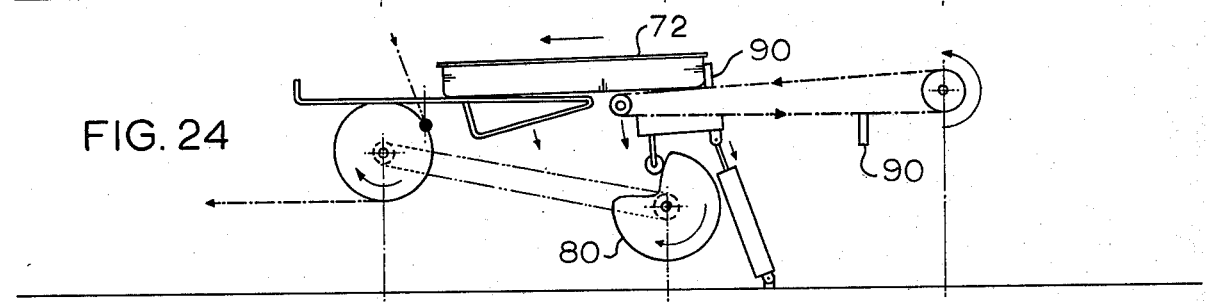
Figure 25:
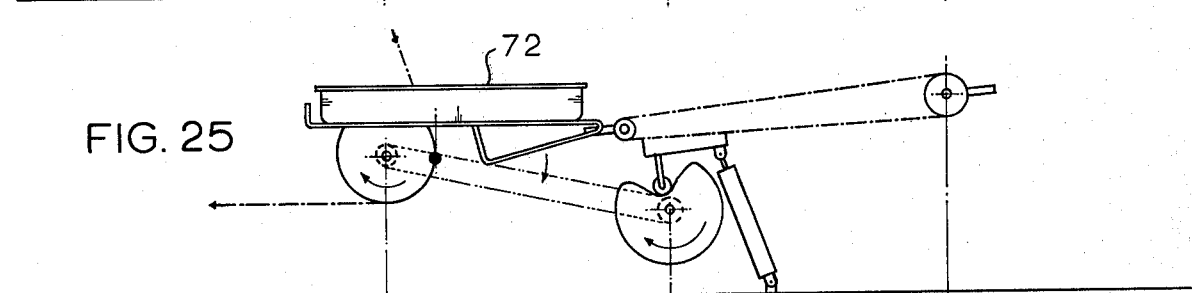
Figure 26:
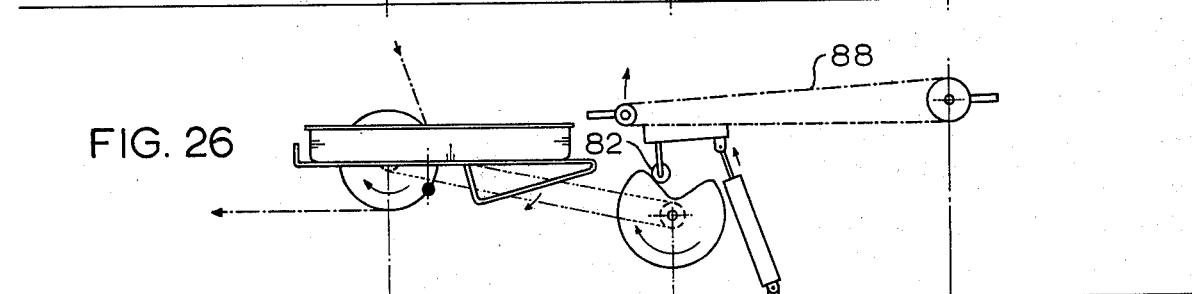
Figure 27:
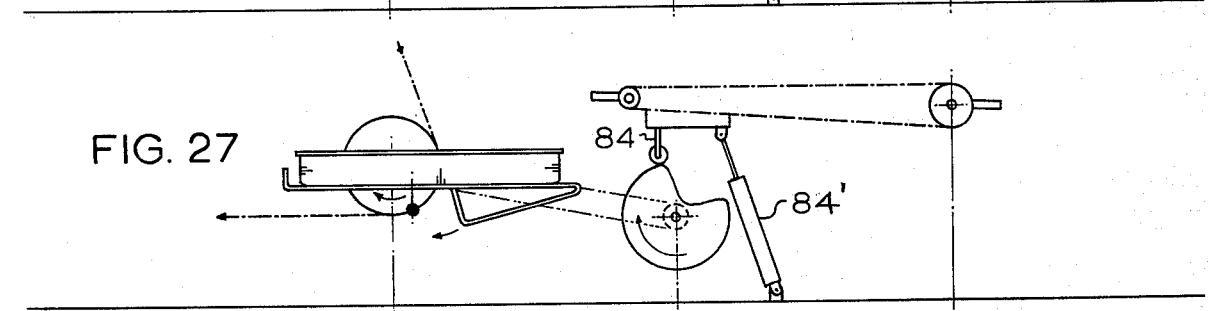

In drawings which illustrate a preferred embodiment of the invention:

FIG. 1 shows a plan view of the general location of the device in relation to loading means and a baking oven, FIG. 2 shows a side view of the device shown in FIG. 1, FIGS. 3 and 4 show a top and side view of the tensioning means, FIG. 4A shows a view along the lines 4A—4A of FIG. 4, FIG. 4B shows a view along the lines 4B—4B of FIG. 4, FIGS. 5, 6 and 7 show means for conveying the racks about the sprocket at the end of a conveyor chain length, FIG. 8 shows means for conveying a rack on a sloping extent of the conveyor endless chain, FIG. 9 shows, schematically, the drive connections at the end of the conveyor, FIGS. 10, 11 and 12 show the construction of the rack and its connection to a conveyor chain, FIGS. 13 and 14 show, schematically, the operation of the conveyor unloader, FIG. 15 shows a top schematic view of the relationship between the members during the unloading operation, FIGS. 16, 17 and 18 show, in more detail, the unloading operation, FIGS. 19 and 20 show the arrangement of the loader, FIG. 21 shows the construction of the loader, FIGS. 22–27 show the unloading operation.

In the drawings FIGS. 1 and 2 a conveyor comprises a pair of endless conveyor chains 10 driven in synchronism by respective drive sprockets 12 and idler sprockets 13 which, sprockets shown, define the ends of the conveyor lengths 14. It will be noted that the inventive features to be described are independent of the number of tiers of chain lengths 14 or of the length thereof. In other words the length and height encompassed by the conveyor tiers may be designed to suit the application and the space available. In the particular embodiment shown which is for a bakery proofer oven, the unloading operation requires the presence of a horizontal length 14H in the chain followed by a downward extent 14V to allow the gentle unloading of the risen loaves in accord with inventive apparatus. Such unloading will, of course, be adjacent the entrance to the main bakery oven MBO (FIG. 2). In this application the loading is performed intermediate the downward slope 14V of the conveyor endless chains, just below the unloader.

Not shown in detail are the walls 15 surrounding the conveyor to define a bakery proofer chamber wherein the temperature is controlled to cause the rising of the dough during a predetermined time in the chamber. Nor are the temperature and humidity environment controls shown. The conveyor is operated at a speed to maintain the materials in the chamber for a such predetermined period.

FIG. 10 shows the rack construction which comprises a rack 16 designed to ride on comprising outer longitudinal members 20 and mediate and rear cross-members 22 and 24 respectively, connected to form a rigid frame. The outer longitudinal members 20 are provided with rollers 26 rotatably mounted on horizontal axes on their outer sides. The rollers 26 are designed to roll on rails 28 shown in FIGS. 5 and 4B over the horizontal or nearby horizontal lengths of the conveyor to maintain the rack in an horizontal orientation (the rail 28L of FIGS. 4 and 4B carries a roller on a rack on the lower of the two chain lengths shown). Means are provided for maintaining the orientation of the rack in a substantially horizontal orientation. Pins 30 extending outwardly from the centre of the horizontal longitudinal member, couple to sockets 32 on the main conveyor chains on each side thereof so that the rack is conveyed by the chain. The intermediate cross support 22 is located well below the upper level of the rear cross member for a purpose to be hereinafter discussed.

Rack bars 34 are rigidly mounted on the rear and mediate cross members 22 and 24 to extend from the rear cross-member with upper surface 36 forwardly of the mediate cross member 24 to a bight 38 where the bar is bent back and downwardly to attach to the mediate cross members. The rack bars 16 define, between them, longitudinally extending recesses, open to the bight 38 end of the rack and extending to the rear cross-member 24 and of a depth from the upper surface 36 of the rack bars to the cross member 22. Such recesses are open in the forward direction at the unloading and loading points and are used in the unloading of such racks as hereinafter discussed. The rear end of the rack bars are turned upwardly at 40, as shown, to contact (if necessary) the rear wall of a tray and to provide (if necessary) forward propulsion thereon. (It is noted that the "forward" rack end becomes the rearward end on alternate conveyor lengths. However the 'forward' end so called because it is at the front during the loading and unloading operations.

The rack 16, as previously described runs along the horizontal lengths with its rollers 20 resting on rails 28 and with the pins 30 coupled to endless conveyor chains 10. There will be provided means (not shown) for avoiding chance withdrawal of the pins 30 from the chains 10. The pins 30 of course link the racks to the chains throughout the courses of the conveyor chains. At the beginning end of a horizontal or approximately horizontal or approximately horizontal length 14 means are provided for altering the course of the rack 16 and chain 10 to form a vertical to a horizontal path. As shown in FIGS. 5, 6 and 7 the leftwardly travelling chain path 10L leads about sprockets 12 (shown schematically in FIGS. 5-7 and as sprockets 12 in FIGS. 3 and 4). At the pair of wheels 42 on each side of the conveyor is provided with recesses 44 to receive the endmost rollers 26 of the rack 16 as the rack pin 30 with the conveyor chain 10 travels about a sprocket 12. The wheels 42 are driven in synchronism with the conveyor chain 10 and have a similar path and the same speed as the chain 10 on the sprocket 12 and are provided with the number of recesses 44 to provide, one at each time of arrival of an endmost rack roller 26. There is provided for each rack rear roller, a guide surface 46 designed to guide the inner roller 26 on a corresponding path to that of the pin 30 and endmost roller 26. In this way, the rack 16, maintained substantially horizontal is caused to travel from one horizontal extent 14 to another. It will be obvious that the same type of mechanism is used to convert upward movement of a chain and rack (maintained horizontal by mechanism to be described) into horizontal movement. It will be obvious that similar mechanism is used at the other end of a length 14 to convert horizontal movement in one direction into horizontal movement in the other direction or into downwardly sloping movement, it being understood that at the other (in the drawings, right hand) end of the conveyor, the opposite end of the rack and the opposite rollers 26 are the outermost and will cooperate at a wheel 42.

FIGS. 3 and 4 show means for tensioning the conveyor chains 10, the location of such tensioning means corresponding to the location of drive means for the conveyor chains 10. The chains 10 are each customarily driven at a plurality of locations along its overall extent to avoid excessive tension on the chains 10. Such drive and tensioning means are shown at the left hand end of the first, third and fifth pairs of horizontal chain extents in FIG. 2. A preferred arrangement of the tensioning means is shown in FIGS. 3 and 4. At each of the first, third and fifth sprockets 12 as shown in FIGS. 3 and 4, the sprockets 12 driving the conveyor chain 10 on each side of the conveyor (called the 'first sprocket' in a number of the claims herein) are each mounted on a stub shaft 48 which is, in turn, mounted on a mounting block 50. (There are thus two 'first' sprockets 12, one for each side of the conveyor mounted on stub shafts 48, to drive (for identical movement) corresponding chains 10 on each side).

Such an independently slidable block 50 is provided on each side of the conveyor and mounted to slide in guideways 52 on the conveyor mounting. The direction of sliding is such that the block 50 may slide in the opposite direction from the direction in which the conveyor chain 10 extends in order to tension the conveyor chain. A second stub shaft 54 is mounted on the block 50 and a sprocket 52 on such second shaft 54 is chain connected to a sprocket 56 on the first stub shaft 48 to drive the latter. In turn the second shaft 54 has a driven sprocket 58 (sometimes referred to in the claims as the 'second sprocket' and such driven or second sprocket 58 is driven by a chain from a drive sprocket 60 exterior to the block.

It is an important facet of the invention, to be described in the succeeding paragraph, to note that the chain 62 from the second sprocket 58 to the drive means must extend in a direction so that tension thereon tends to extend the conveyor chain 10. The drive sprocket 60 is mounted on a drive shaft 66 which extends across the conveyor width to mount both drive sprockets 60 driving, in synchronism, the two second sprockets 58 on the blocks 50 on opposite sides of the conveyor chain 10. The drive shaft 66 is driven by a power source 64 shown only schematically. Although such power sources are not shown, as well known to those skilled in the art, it should be here noted that with the application herein, which is a high torque low speed drive, a piston driven hydraulic engine is found the best power source.

In the tensioning device so far described it will be noted that an assembly mounted on block 50 contains a first sprocket 12 mounted on the block for driving the conveyor chain 10 and a second sprocket 58 mounted on the block driven by the drive means 60-64. The advantages of one facet of the invention stem from the fact that the second sprocket 58 is of smaller diameter than the first sprocket. It will be obvious that, under driving conditions, the torques on the first and second sprockets 12 and 58 must be the same. The result in that the tension on the chain 62 from the drive means 60 to the second sprocket 58 must be greater than the tension on the conveyor chain 10. The result is that the tension on the chain 62 to the second sprocket 58 acts to tension the conveyor chain. As illustrated by the three tensioning means shown, these may be applied at the ends of as many lengths of conveyor chain as good design requires.

FIG. 9 schematically shows the relationship between three hydraulic driving means 64 and drive shafts 66 for three pairs (the first, third and fifth) chain lengths. The drive 62 from shafts 66 to the three tension assemblies is shown. Although the hydraulic drives 64-60 are, of course designed to drive all parts of chain 10 at the same speed, any necessary equalization is provided by the sprocket and chain connections 70 joining the shafts 60.

In general it will be noted that the conveyor chains 10 transport rack 16 on which pans carrying the loaves (or other materials in other applications) may be located. The conveyor is arranged so that the racks 16 may maintain the pans 72 facing upwardly thereon while the chain follows the path delineated for it.

The construction of the racks 16 with defined recesses below the upper surfaces 36 of the rack bars 3, and between them, has been shown. These recesses are accessible when the rack travels toward one end of the conveyor in this case toward the right.

The recesses are therefore accessible from the end of each rack facing rightward in the drawings for receiving cantilever members 68 shown in FIGS. 15-17, 12-14, 18 and 19 to project thereinto from the forward end of the section in the spaces below the upper surfaces 36 of the bars, and extending onward along the rack section a substantial distance.

Such cantilever members 68 in combination with the rack may be used for loading or unloading. However in the bakery proofer, these elements are used for unloading and the unloading alternative will be described first.

The description will assume that pans 72 have been loaded on the racks 16 in a manner to be hereinafter described, and are travelling along the conveyor.

The unloader using the combination above described must be located at the end of a horizontal length 14H of conveyor travel where it turns into a downward slope 14V. So far as the unloading function is concerned, this downward slope could be vertical, however for reasons of easy downward (or upward) travel of the conveyor the guiding members along such extents are made sloping since the operation of the chain and rack guides maintaining the rack horizontal is more easily arranged.

The guidance of racks on the conveyor, in upright orientation while travelling downwardly is best shown in FIG. 8. At the end of a horizontal length 14H the forward roller 26 is guided about a recessed wheel 42 as described in connection with FIGS. 3–7. Each rearward roller is guided into a guideway 70 during the time the forward roller is in a recess 44. The guideway controlling the location of the inner roller 26 maintains the rack horizontal without support for the outer roller. At the bottom of the guideway a recessed wheel 42 is provided to convert the downward motion of each inner rollers 26 into travel along a rail 28.

At the end of the horizontal travel along the upper extent there are (FIGS. 19 and 20) located a plurality of parallel spaced cantilever unloader members 68 comprising chains 74 supported on guides 76 (very like a chain saw arrangement) at their cantilever ends and a sprocket drive 78 at the supported end. The shaft 80 for the sprocket drive and a support 82 extending through the chain saw guides, and both mounted on means not shown exterior to the conveyor; act to maintain the cantilever members 76 in the desired level, attitude and spacing. The spacing of the cantilever members in such that they will each be received between pairs of the rack bars 36 of a rack with extents 34 leading and reaching the end of the horizontal extent; and the attitude and level of such cantilever members is such that the members 70, 74 are received in the defined recesses between the rack bars 36–34 and (initially) below the upper level 36 of such bars. The chains 74 are driven (see FIGS. 16–18) in a direction to unload pans travelling on the rack from the rack and onto the chains 74. To avoid any risk of bumping the pans, the chains 74 are driven at a rotary speed to move the pans at a slightly higher speed than the pans are moved by the conveyor.

In operation, racks 16 carrying pans travelling along the horizontal length 14H (FIG. 2) receive the cantilever chains 74 at the end of the length 14H. As the upper surface 36 of the racks drops below that of the cantilever chains 74, these contact and start to support the pans which are then impelled by the chains to move the pans off the conveyor. This provides, with the slow moving conveyor, a gentle transition from the conveyor to the cantilever chains. Such gentle unloading is particularly suitable for unloaders which are, at this point, unloading risen dough, from a bakery proofer for baking.

Leaving the specific embodiment temporarily, it will be noted that in a conveyor moving through a freezer for TV dinners, it will be noted that the loading of such a conveyor must be gently performed. Accordingly the conveyor for such loading might be considered as the conveyor of FIG. 2 and FIGS. 16–18 operating in a reverse direction, with racks 16 as shown, and with the cantilever members 74, 70 located as shown but with the chains 10 operating in the opposite direction. In accord with the invention (and noting that stops and synchronizing means, not shown, but well known to those skilled in the art, would be used), the cantilever members would provide pans 72 in the path of racks moving between the cantilever members, i.e. in a reverse direction to that shown in FIGS. 2, 16–18. As the upper surfaces 36 of the racks 16 move above the upper surfaces of the chains 74, the rack bars pick up the pans. The chains 74 may if desired be provided with dogs to ensure positive placing of the pans to a predetermined depth on the racks. After the rack 16 has lifted the pan off the chains 74, and before the mediate cross member 22 risen sufficiently to contact the lower surface of chain 74, the conveyor turns into its horizontal component carrying the pan away from the loading means.

It is desired to return to the description of the specific embodiment, where the device just described is used as an unloader.

In the preferred embodiment, the loading is performed by the platform 78 shown in FIGS. 21–27. The platform 78 shown in FIGS. 21 to 27 is designed to be horizontal during the time that it receives loaded pans 72 in any conventional manner through means not shown.

The means of loading the platform 78 is not part of the invention, however the platform here comprises a plurality of rollers having axes directed longitudinally relative to the conveyor travel direction, and designed to receive pans from a direction transverse to the conveyor from means 80 schematically shown in FIG. 10. In order to tip, the platform 78 is a separate unit from the transport or conveyor means 80 designed to provide pans thereto.

The platform 78 is located so that one side is close to a portion of the rack 16 path on the conveyor and the opposite or remote side is swingably connected to a support at shaft 82 to allow the platform 78 to pivot about a axis approximately horizontal and transverse to the direction of conveyor travel. The conveyor adjacent end of the platform is located to load onto the racks 16 during their downward travel, here just below the unloading location (see FIGS. 2, 22–27).

The loading platform is designed to be of fixed orientation while being loaded from an outside supply. However the loading platform 78 is located to be synchronized with the rack travel down the conveyor extent so that the conveyor-adjacent part of the platform travels in unison (see FIGS. 22–27) with a rack on the conveyor over a small arc of movement of the platform while a pan is transferred from the platform 78 to the rack 16.

Although the loading and unloading of pans is discussed as if a single pan 72 were the width of the conveyor, in fact, and particularly in the bakery proofer application, several pans 72 encompass the width of the conveyor, for example it may be possible to place 5 pans across the width of the conveyor. This however does not affect the operation and advantages of the invention, as here disclosed, which do not depend on the width of the conveyor.

Preferably, the control for the conveyor adjacent end of the loader 78, is a rotating peripheral cam surface 80 as shown in FIG. 21. The cam is driven by sprocket and chain from the drive by means not shown in detail for the conveyor endless chains and is hence synchronized therewith, to provide one revolution of the cam 80 for each rack position passing the loading location. A cam follower 82 is arranged to bear downwardly on the cam 80 and the cam follower 82 is connected by a connecting member 84 to the forward end of the loading platform to cause movement of the platform 78 in accord with the cam shaping. The platform 78 therefore biases the cam follower 82 onto the cam 80 by gravity.

The cam 80 is shaped to maintain the loading platform 78 in a stationary position during the loading of pans thereon, but to cause the conveyor adjacent end of the platform to tip through a predetermined angle during the transfer of pans from the platform to a rack. Although this angle is exaggerated, in the drawings, for the purposes of illustration, it is, with the slow conveyor movement, usually between 6° and 7°.

It is considered undesireable to have the full weight of the platform, or of the platform and pans, on the cam follower and cam. There is therefore, preferably provided a hydraulic cylinder 84' mounted exterior to the conveyor and connected to the loaded platform near the conveyor-adjacent end, to support 80% of the weight of the platform so that the cam follower 82 is still biased into contact with the cam 80, but without the full weight of platform 78 and loaded pan resting thereon.

The cylinder 84' is also used to supply full support when the platform 78 is not fully loaded with its required complement of pans 72 to avoid the tipping of the loading platform under control of the cam 80 when there is no full complement of pans thereon. This tipping avoidance may be achieved in a plurality of ways, however the preferred mode is to have the hydraulic cylinder 84 normally energized to bear 100% of the weight and biasing the loading platform to upward position against a stop, not shown, which maintains the cam follower 82 in virtual contact with the path of the non-indented portion of the cam, supported by the cylinder against the stop. First sensing means, not shown, are provided to determine when the platform is loaded with its complement of pans. These are designed to reduce the hydraulic pressure on the cylinder 84' is cause it to bear only 80% of the weight so that the cam follower 82 rests on the cam. However there are also provided means to prevent actuation by the first sensing means when the cam follower is over the cam depression, 86.

The operation of the control means just discussed, is that the cam 80 is continually turned by the drive for the moving conveyor endless chain 10. However until the platform is fully loaded with pans, the cylinder 84' fully supports the platform which there is not, then, controlled by the cam. When the first sensing means senses that the platform has its full complement of pans, and, so soon thereafter as the second sensing means determines that the follower is not over the cam depression, the upward force of the cylinder 84' is reduced sufficiently that the cam follower 82 rests on the cam 80. When the cam 80 thereafter turns a sufficient amount, the dip in the cam then causes the platform to tip to maintain its platform adjacent edge to tip in concert with the passing rack 16 on the conveyor. The pans 72 are transferred to the rack during the tipping action, by means to be discussed. After the transfer, the action of the cam 80, cam follower 82 brings the loading platform back to its upper orientation, the first sensing means senses the return of the platform to level position and applies full pressure to the hydraulic cylinder 84' until the full complement of pans is again sensed. Thus racks passing the loading position pass an empty if there is not a complement of pans to be loaded.

The loading means, operable during the tipping of the platform, preferably comprises a plurality of sprocket driven chains 88 extending longitudinally relative to the conveyor travel direction and extending over and under and about the conveyor adjacent end of the platform. These chains are mounted on the platform for tipping therewith. The chains carry a dog 90, (here two) designed to project upwardly to contact the pan and to propel it onto the conveyor rack. The chains 88 are maintained stationary with a dog 90 on each chain at a location available to shove pans from the platform onto a rack. Control means, not shown are designed to be actuated by: the sensing means which determines that (a) the full complement of pans is on the loading platform and (b) that the intended portion of the cam has arrived at the cam follower so that the platform is about to tip. The control means is designed, just as the platform begins to tip, to cause the chains to move to cause the dogs thereon to move the pans 72 from the platform 78 onto the adjacent rack 16. The speed of the chains 88 is controlled to cause the pans 72 to be completely moved from the platform onto the rack during the tipping level. The control means is then caused to stop the dogs 90 in the position shown in FIG. 21.

With the tipping loader, discussed above, it is possible to use an alternative to the chain operated dogs discussed above.

An alternative, particularly suitable with high pans is overhead, downwardly directed pushers which contact the conveyor-remote sides of the pans and push them from the platform onto the rack. Such overhead downwardly directed pushers are synchronized with the conveyor motion as with the chain driven dogs described, and such overhead downwardly directed pushers are mounted to tilt with the platform.

I claim:
1. Improved construction for endless conveyors driven by an endless chain,
said chain being mounted for movement on a mounting,
said endless conveyor chain being driven and supported by sprockets,
and where a first such sprocket defines the end of a length of said endless conveyor chain,
the shaft mounting said sprocket forming part of an assembly which is movably on said mounting to allow movement of said shaft in a direction to increase or decrease the tension along such length in said endless chain,
a second such sprocket, chain driven and rotatably mounted in said assembly for translation therewith,
said second sprocket being connected to said first sprocket so that rotation of said second sprocket drives said first sprocket,
drive means mounted on said mounting including a third sprocket connected by a drive chain to said second sprocket for driving the latter,
said third sprocket being disposed on the opposite side of said second sprocket from said conveyor chain length whereby tension in said drive chain opposes tension in said length of conveyor chain, wherein said second sprocket is of smaller diameter than said first sprocket.

2. A conveyor as claimed in claim 1 wherein the course of said conveyor and said chain is arranged to run back and forth in lengths arranged in a plurality of tiers, and wherein a plurality of such first sprockets are provided defining the ends of adjacent pairs of said lengths.

3. Conveyor as claimed in claim 1 having such an endless chain and first sprockets adjacent each side thereof, and such second sprockets and drive chains adjacent each side thereof.

4. Conveyor as claimed in claim 2 having such an endless chain and first sprockets adjacent each side thereof, and such second sprockets and drive chains adjacent each side thereof.

* * * * *